United States Patent
Piemonte

(10) Patent No.: US 9,541,417 B2
(45) Date of Patent: Jan. 10, 2017

(54) PANNING FOR THREE-DIMENSIONAL MAPS

(71) Applicant: Apple Inc., Cupertino, CA (US)

(72) Inventor: Patrick S. Piemonte, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 792 days.

(21) Appl. No.: 13/632,051

(22) Filed: Sep. 30, 2012

(65) Prior Publication Data

US 2014/0071130 A1 Mar. 13, 2014

Related U.S. Application Data

(60) Provisional application No. 61/699,793, filed on Sep. 11, 2012, provisional application No. 61/655,995, filed on Jun. 5, 2012, provisional application No. 61/656,032, filed on Jun. 6, 2012, provisional application No. 61/656,043, filed on Jun. 6, 2012, provisional application No. 61/657,880, filed on Jun.

(Continued)

(51) Int. Cl.
| | | |
|---|---|---|
| G01C 21/36 | (2006.01) | |
| G06F 3/0481 | (2013.01) | |
| G06F 3/0488 | (2013.01) | |

(52) U.S. Cl.
CPC ......... *G01C 21/367* (2013.01); *G01C 21/3638* (2013.01); *G06F 3/04815* (2013.01); *G06F 3/04883* (2013.01)

(58) Field of Classification Search
None
See application file for complete search history.

(56) References Cited

U.S. PATENT DOCUMENTS

| | | |
|---|---|---|
| 5,717,848 A | 2/1998 | Watanabe et al. |
| 6,163,269 A | 12/2000 | Millington et al. |
| 6,496,189 B1 | 12/2002 | Yaron et al. |

(Continued)

FOREIGN PATENT DOCUMENTS

| | | |
|---|---|---|
| EP | 1788541 | 5/2007 |
| WO | WO 2005/103624 | 11/2005 |
| WO | WO 2012/007745 | 1/2012 |

OTHER PUBLICATIONS

"Google Earth API" https://developers.google.com/earth/documentation/camera_control. Archived on Mar. 26, 2012. Retrieved on Apr. 20, 2015 from <https://web.archive.org/web/20120326235132/https://developers.google.com/earth/documentation/camera_control>.*

"Topic 2: Map Projections and Coordinates Systems" http://hosting.soonet.ca/eliris/remotesensing/bl130lec2.html. Archived on Sep. 23, 2007. Retrieved on Apr. 20, 2015 from <https://web.archive.org/web/20070923035156/http://hosting.soonet.ca/eliris/remotesensing/bl130lec2.html>.*

(Continued)

*Primary Examiner* — Zhengxi Liu
(74) *Attorney, Agent, or Firm* — Adeli LLP

(57) ABSTRACT

Some embodiments provide a non-transitory machine-readable medium that stores a program which when executed on a device by at least one processing unit performs panning operations on a three-dimensional (3D) map. The program displays a first 3D perspective view of the 3D map. In response to input to pan the 3D map, the program determines a panning movement based on the input and a two-dimensional (2D) view of the 3D map. The program pans the first 3D perspective view of 3D map to a second 3D perspective view of the 3D map based on determined panning movement. The program renders the second 3D perspective view of the 3D map for display on the device.

20 Claims, 13 Drawing Sheets

Related U.S. Application Data 10, 2012, provisional application No. 61/699,855, filed on Sep. 11, 2012.

(56) References Cited

U.S. PATENT DOCUMENTS

| | | | |
|---|---|---|---|
| 6,587,784 | B1 | 7/2003 | Okude et al. |
| 7,551,172 | B2 | 6/2009 | Yaron et al. |
| 7,746,343 | B1 | 6/2010 | Charaniya et al. |
| 8,237,713 | B2 | 8/2012 | Yaron et al. |
| 2001/0028350 | A1 | 10/2001 | Matsuoka et al. |
| 2004/0236507 | A1 | 11/2004 | Maruyama et al. |
| 2006/0026521 | A1 | 2/2006 | Hotelling et al. |
| 2006/0031786 | A1 | 2/2006 | Hillis et al. |
| 2008/0062173 | A1 | 3/2008 | Tashiro |
| 2008/0198158 | A1 | 8/2008 | Iwamura et al. |
| 2009/0096753 | A1 | 4/2009 | Lim |
| 2010/0104174 | A1 | 4/2010 | Rohlf et al. |
| 2010/0123737 | A1 | 5/2010 | Williamson et al. |
| 2010/0134425 | A1 | 6/2010 | Storrusten |
| 2011/0007000 | A1 | 1/2011 | Lim |
| 2011/0164029 | A1 | 7/2011 | King et al. |
| 2011/0249030 | A1 | 10/2011 | Hirose et al. |
| 2011/0302527 | A1 | 12/2011 | Chen et al. |
| 2012/0019513 | A1 | 1/2012 | Fong et al. |
| 2012/0062602 | A1* | 3/2012 | Vadhavana et al. .......... 345/676 |
| 2012/0062604 | A1* | 3/2012 | Lobo et al. .................. 345/684 |
| 2012/0127170 | A1 | 5/2012 | Varadhan |
| 2012/0200604 | A1 | 8/2012 | Imaeda et al. |
| 2012/0314040 | A1 | 12/2012 | Kopf et al. |

OTHER PUBLICATIONS

Gus Class, "Custom Gestures for 3D Manipulation Using Windows", Feb. 23, 2011, retrieved from http://www.codeproject.com/Articles/161464/Custom-Gestures-for-D-Manipulation-Using-Windows on Mar. 16, 2016.*

Author Unknown, "Google Maps—Two Finger Rotate in Nexus One," androidapk, Apr. 9, 2011, 1 page, available at http://www.youtube.com/watch?v=f7VNoErYNt8.

Author Unknown, "3D Building Features on Google Maps Mobile App with 2 Fingers Tilt, Rotate, Zoom," adistarone, Jul. 21, 2011, 1 page, available at http://www.youtube.com/watch?v=lqkKK1Xt8W0.

Author Unknown, "Motorola Xoom: Google Maps," TechHarvest, Feb. 25, 2011, 1 page, available at http://www.youtube.com/watch?v=adkl5zMp7W4.

Author Unknown, "Google Maps Voice Navigation in Singapore," software2tech, Jul. 20, 2011, 1 page, available at http://www.youtube.com/watch?v=7B9JN7BkvME.

Ruhs, Chris, "My Favorite Android Apps: Maps," Jun. 24, 2011, 1 page, available at http://www.youtube.com/watch?v=v2aRkLkLT3s.

Partala. Timo, et al., "Speed-Dependent Camera Control in 3D Mobile Roadmaps," Intelligent Interactive Assistance and Mobile Multimedia Computing, Month Unknown, 2009, pp. 143-154, Springer-Verlag, Berlin/Heidelberg, Germany.

* cited by examiner

PANNING FOR THREE-DIMENSIONAL MAPS

CLAIM OF BENEFIT TO PRIOR APPLICATIONS

This application claims the benefit of U.S. Provisional Patent Application 61/655,995, filed Jun. 5, 2012; U.S. Provisional Patent Application 61/656,032, filed Jun. 6, 2012; U.S. Provisional Patent Application 61/656,043, filed Jun. 6, 2012; U.S. Provisional Patent Application 61/657,880, filed Jun. 10, 2012; U.S. Provisional Patent Application 61/699,855, filed Sep. 11, 2012; and U.S. Provisional Patent Application 61/699,793, filed Sep. 11, 2012. U.S. Provisional Patent Application 61/699,793 is incorporated herein by reference.

BACKGROUND

Today, many map applications and mapping services allow users to browse a map using a number of different operations. For example, users are typically allowed to zoom in on the map, zoom out from the map, rotate the map, move (i.e., pan) the map to adjust the portion of the map that is viewable, etc.

In many cases, when a user wishes to move the map, the user selects a location on the map and "drags" the map in the desired direction and for the desired distance. When used in combination with other operations, the user is able to navigate to and view different portions of the map at different levels of detail.

BRIEF SUMMARY

For a mapping application, some embodiments of the invention provide a novel method for performing pan operations on a three-dimensional (3D) map. In some embodiments, the method (1) receives input through a 3D perspective view of the 3D map to perform a panning operation to the 3D map. To perform the panning operation to the 3D map, the method of some embodiments (1) determines a panning movement in a two-dimensional (2D) orthographic view of the 3D map that corresponds to the 3D perspective view of the 3D map based on the input and (2) pans the 3D map according to the panning movement.

In some embodiments, the mapping application provides an inertia effect for panning operations. When a user provides a particular type of input (e.g., input that terminates at a velocity greater than a threshold velocity) to pan the 3D map, the mapping application generates an inertia effect that causes the 3D map to continue panning and decelerate to a stop. The inertia effect in some embodiments provides the user with a more realistic interaction with the 3D map that mimics behaviors in the real world.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a mapping application, some embodiments of the invention provide a novel method for performing pan operations on a three-dimensional (3D) map. In some embodiments, the method (1) receives input through a 3D perspective view of the 3D map to perform a panning operation to the 3D map. To perform the panning operation to the 3D map, the method of some embodiments (1) determines a panning movement in a two-dimensional (2D) orthographic view of the 3D map that corresponds to the 3D perspective view of the 3D map based on the input and (2) pans the 3D map according to the panning movement.

Figure 1:
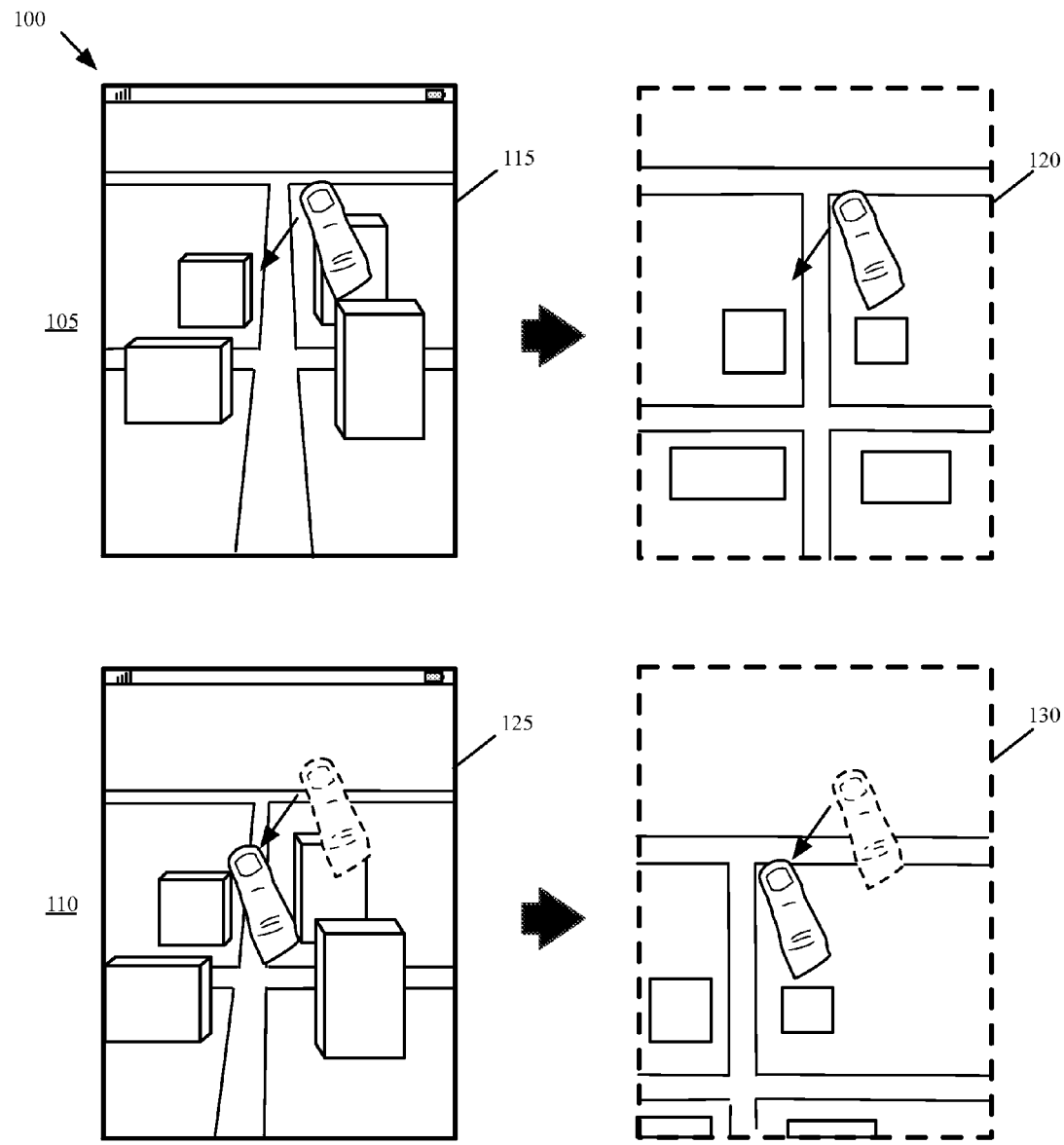
FIG. 1 conceptually illustrates an example panning operation performed by a mapping application of some embodiments.

FIG. 1 conceptually illustrates an example panning operation performed by a mapping application of some embodiments. Specifically, FIG. 1 conceptually illustrates a GUI 100 at two different stages 105 and 110 that shows a panning operation according to some embodiments of the invention.

The first stage 105 illustrates a 3D map view 115 (also referred to as a 3D perspective view) of a 3D map. As shown, the 3D map view 115 includes several roads and four buildings. In some embodiments, the mapping application displays the 3D map view 115 by using a virtual camera that identifies a location and orientation (e.g., pan, tilt, roll, etc.) of a field of view (e.g., a viewing frustum) of the 3D map and rendering the field of view in order to generate the 3D map view 115 for display on a device on which the mapping application is running Details of rendering operations performed by the mapping application of some embodiments are described in U.S. patent application Ser. No. 13/632,035, entitled "Rendering Maps," concurrently filed with this application, and now issued as U.S. Pat. No. 9,111,380. U.S. patent application Ser. No. 13/632,035, now issued as U.S. Pat. No. 9,111,380, is incorporated herein by reference.

The first stage 105 also illustrates that a user is providing input (e.g., a swipe gesture) to perform a panning operation on the 3D map by touching a finger on a touchscreen of the device on which the mapping application is operating and dragging the finger in a downward and left direction. In particular, the user is touching a location at or near the farthest road in the background shown in the 3D map view 115 and dragging the finger towards the foreground of the 3D map view 115 in order to pan the location towards the user.

In addition, the first stage 105 shows a 2D map view 120, which is a 2D orthographic view of the 3D map that corresponds to the 3D map view 115. As shown, the 2D map view 120 includes the same roads and four buildings illustrated in the 3D map view 115. In some embodiments, the 2D map view 120 is actually a 3D map view that the mapping application identifies from the virtual camera that is positioned in a top-down viewing position (i.e., the virtual camera is pointing straight down) of the 3D map while, in some embodiments, the 2D map view 120 is a 2D map view that the mapping application identifies from a 2D version of the 3D map In some embodiments, the mapping application identifies the 2D map view 120 in order to use the 2D map view 120 to determine a panning operation to perform on the 3D map based on the input provided by the user. The mapping application of some such embodiments does not actually render the 2D map view 120 nor display the 2D map view 120.

In some embodiments, a 3D map view shows a different portion of the 3D map depending on different positions and orientations of the virtual camera in the 3D map. As such, the portion of the 3D map that the mapping application of some embodiments renders for a 3D map view is different than the portion of the 3D map that the mapping application identifies for a 2D map view that corresponds to the 3D map view. Different embodiments use different techniques to identify a 2D map view of the 3D map that corresponds to a 3D map view of the 3D map. For instance, the portion of the 3D map that the mapping application of some embodiments identifies as the 2D map view that corresponds to the 3D map view might encompass, overlap, or be entirely included in the portion of the 3D map from which the mapping application rendered the 3D map view. In some embodiments, the mapping application modifies (e.g., resizes, stretch, compress, scale, etc.) the identified 2D map view that corresponds to the 3D so that the portion of the 3D map shown in 2D map view is the same or similar at the portion of the 3D map shown in the 3D map view.

As shown in the first stage 105, the 2D map view 120 also shows the same input provided by the user on the 3D map view 115. This conceptually illustrates the mapping application of some embodiments applying the user's input to the 2D map view 120 to determine a direction and a distance (e.g., a vector) to pan the 3D map view 115. In some embodiments, the mapping application pans the 3D map based on the determined distance and direction.

The second stage 110 illustrates a 3D map view 125 of the 3D map after the mapping application pans the 3D map. In this example, the 3D map view 125 shows that the mapping application has panned the 3D map from the 3D map view 115 to the 3D map view 125 based on the user's input and the 2D map view 120. As illustrated, the 3D map view 125 shows a view of the 3D map after the mapping application pans the 3D map upwards and toward the right from the 3D map view 115 in a direction and for a distance determined based on the user's input that is applied to the 2D map view 120.

In addition, the second stage 110 illustrates a 2D map view 130 of the 3D map that corresponds to the 3D map view 125 of the 3D map. In some embodiments, the mapping application identifies the 2D map view 125 in the same or similar manner that that mapping application identified the 2D map view 120 using any of many different techniques described above. In the second stage 110, the 2D map view 130 shows a 2D orthographic view of the 3D map after the mapping application pans the 3D map upwards and towards the right from the 2D map view 120 in a direction and for a distance determined based on the user's input that is applied to the 2D map view 120. That is, the direction and distance that the mapping application determines to pan the 3D map from the 2D map view 120 is the same direction and distance that the mapping application pans the 3D map from the 3D map view 115.

The panning techniques and examples described above and below in this application provide a more uniform panning operation when viewing a 3D map in a 3D mode. If the mapping application was to use the actual location in the 3D map that corresponds to the location in a 3D map view of the user's input to which or from which to pan the 3D map, the mapping application would pan the 3D map in a manner that might be undesirable to the user or difficult for the user to control. For instance, if the user was to provide input to pan the 3D map away from or towards a location far off in the distance at or near a horizon in a 3D map view of the 3D map, the mapping application would pan the 3D map view a large amount. In other words, the distance that the mapping application in such instances pans the 3D map using this approach is not proportional to the user's input. Thus, by using a distance determined based on the user's input applied directly to a corresponding 2D orthographic view of the 3D map view, the mapping application of some embodiments provides the user a more usable and controllable panning operation to pan the 3D map because the distance that the mapping application pans the 3D map is proportional to the input provided by the user (e.g., a one-to-one ratio between the user's input and the translation distance).

Figure 2:
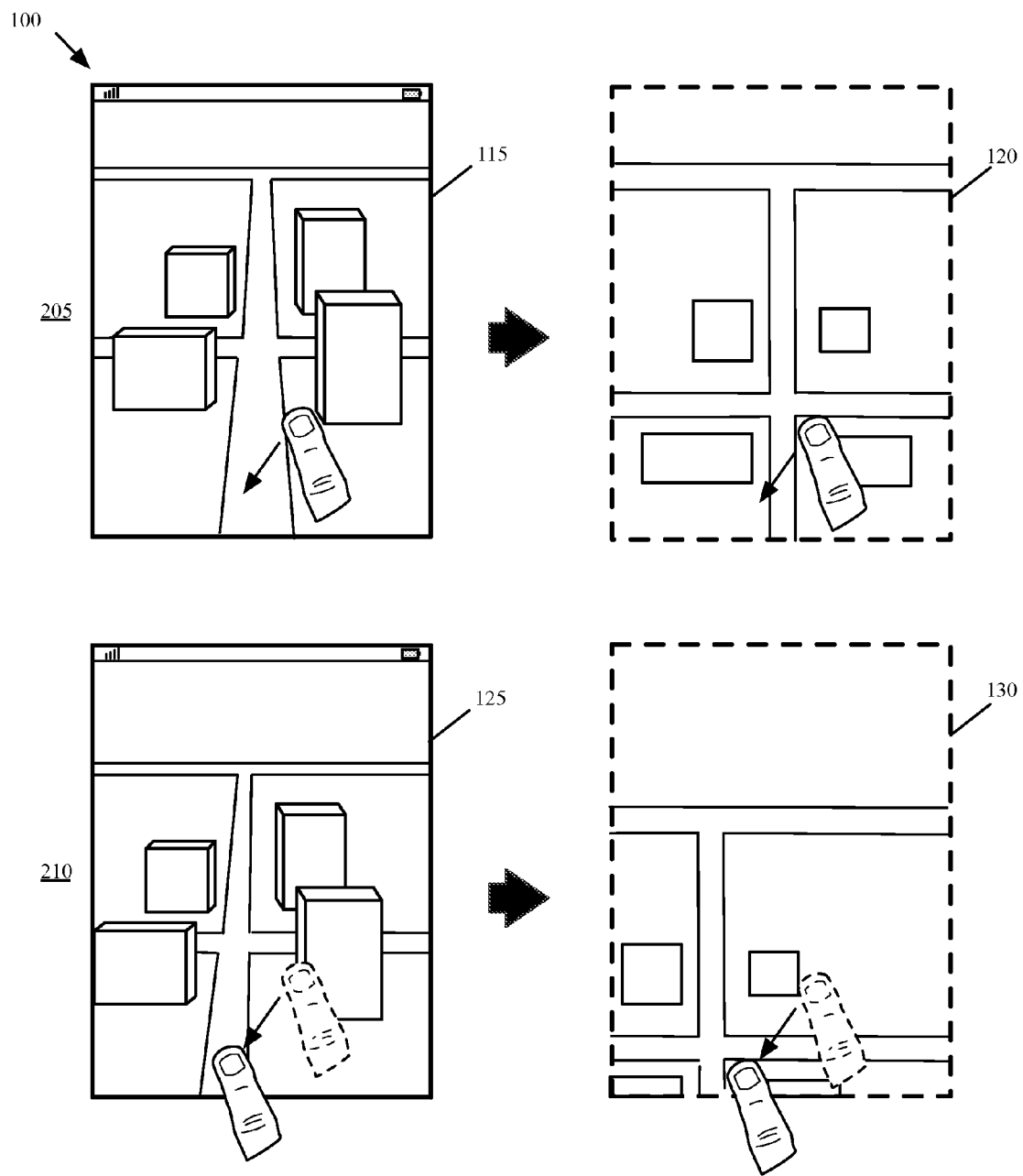
FIG. 2 conceptually illustrates another example panning operation performed by a mapping application of some embodiments.

FIG. 2 conceptually illustrates another example panning operation performed by a mapping application of some embodiments. In particular, FIG. 2 conceptually illustrates the GUI 100 at two different stages 205 and 210 that shows a panning operation according to some embodiments of the invention.

The first stage 205 is similar to the first stage 105 described above by reference to FIG. 1 except the first stage 205 shows the user providing input to pan the 3D map view 115 of the 3D map at a different location of the touchscreen. As shown, the first stage 205 shows the user is providing input (e.g., a swipe gesture) to perform a panning operation on the 3D map by touching the finger on a location at or near the closest road in the foreground shown in the 3D map view 115 and dragging the finger farther towards the foreground of the 3D map view 115 in order to pan the location towards the user. For this example, the user drags the finger in the same direction and distance that the user drags the finger in the first stage 105 described above by reference to FIG. 1.

The first stage 205 shows the 2D map view 120, which corresponds to the 3D map view 115, that the mapping application of some embodiments identifies to determine a panning operation to perform on the 3D map. In this example, the 2D map view 120 shows the same input provided by the user on the 3D map view 115 to conceptually illustrate the mapping application of some embodiments applying the user's input to the 2D map view 120 to determine a direction and a distance (e.g., a vector) to pan the 3D map view 115. In some embodiments, the mapping application pans the 3D map based on the determined distance and direction.

The second stage 210 illustrates the 3D map view 125 of the 3D map after the mapping application pans the 3D map. As shown, the mapping application in this example has panned the 3D map from the 3D map view 115 to the same location to which the mapping application pans the 3D map illustrated in FIG. 1. Thus, FIGS. 1 and 2 illustrate that when a user provides the same input to pan a 3D map (e.g., a direction and a distance to pan the 3D map) from the same location of the 3D map, the mapping application of some embodiments pans the 3D map to the same location in the 3D map regardless of the location at which the user provides the input on the 3D map view displayed on the touchscreen of the device. This is because the mapping application in some embodiments determines the panning operation based on the user's input as applied to a 2D orthographic view of the 3D map view.

As mentioned above, in some embodiments, the mapping application does not render the 2D map views illustrated in FIGS. 1 and 2. More particularly, the 2D map views illustrated in the figures described above and below of this application are shown for purposes of explanation.

Several more detailed embodiments of the invention are described in the sections below. Section I provides a conceptual description of panning operations for panning a 3D map according of some embodiments. Next, Section II conceptually describes an inertia effect that the mapping application of some embodiments provides for panning operations. Section III follows this with a description of a software architecture of the mapping application of some embodiments. Next, Section IV describes several electronic systems that implement some embodiments of the invention. Finally, Section V describes a map service environment in which the mapping application of some embodiments operates.

I. Panning Operations for a 3D Map

Figure 3:
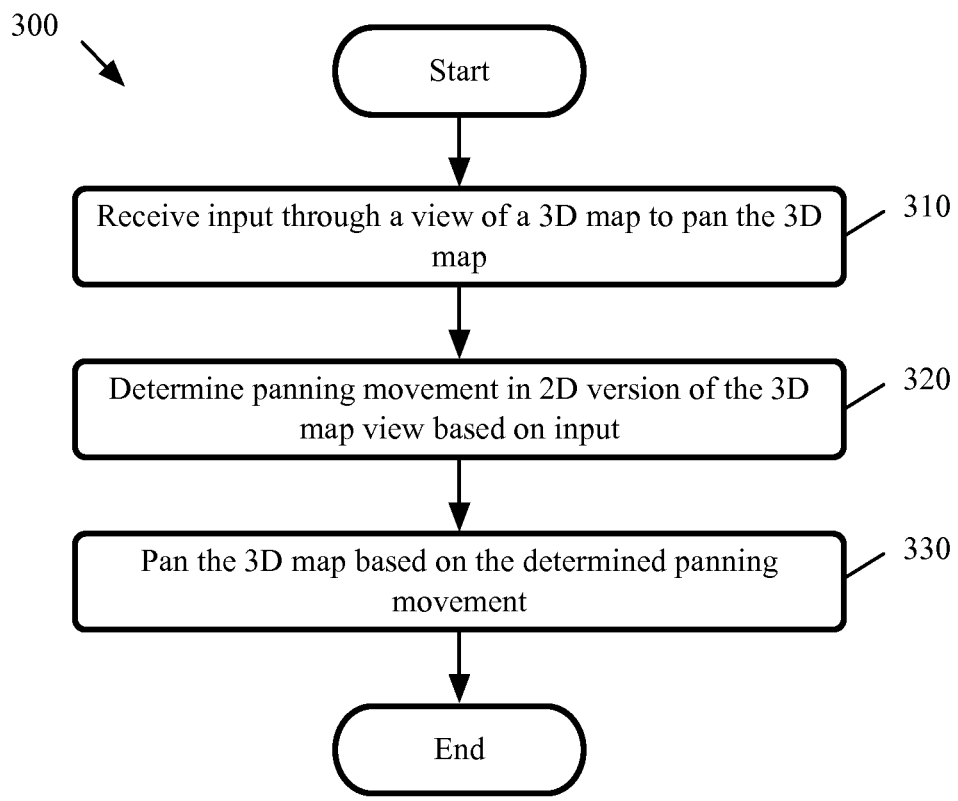
FIG. 3 conceptually illustrates a process of some embodiments for panning a 3D map.

As described above, the mapping application of some embodiments determines a panning operation for panning a 3D map based on (1) a 2D map view that corresponds to a 3D map view of the 3D map and (2) input that a user provides through the 3D map view. FIG. 3 conceptually illustrates a process 300 of some embodiments for panning a 3D map. In some embodiments, the mapping applications described above and below by reference to FIGS. 1, 2, and 8 perform the process 300 to perform a panning operation to a 3D map. The mapping application of some embodiments performs the process 300 when the mapping application is in a 3D map browsing mode. Alternatively or in conjunction with the map browsing mode, the mapping application performs the process 300 when the mapping application is in a 3D navigation mode.

The process 300 starts by receiving (at 310) input through a view of a 3D map to pan the 3D map. In some embodiments, the process 300 receives input from a user through a 3D map view displayed on a touch screen of a device on which the mapping application executing the process 300 is running. Different embodiments define any number of different types of input for panning a 3D map. For instance, some embodiments define a single touch gesture, such as the ones described above and below by reference to FIGS. 1, 2, and 8 a multi-touch gesture (e.g., a two-touch swipe gesture), etc. for panning a 3D map.

Next, the process 300 determines (at 320) a panning movement in a 2D orthographic view of the 3D map based on the received input. The process 300 of different embodiments determines the panning movement in the 2D orthographic view of the 3D map in different ways. For instance, in some embodiments, the process 300 determines the panning movement by applying the received input to the 2D orthographic view of the 3D map in order to identify a direction and a distance in 2D for panning the 3D map.

Finally, the process 300 pans (at 330) the 3D map based on the determined panning movement. In some embodiments, the process 300 pans the 3D map by moving position of the virtual camera that is used to identify the view of the 3D map in the direction and for the distance of the panning movement and rendering for display the view of the 3D map from the virtual camera's new location in the 3D map. The process 300 of some embodiments also provides an animation of the panning movement by continuously rendering and displaying the virtual camera's view of the 3D map while the virtual camera is moving from the previous location to the new location in the 3D map.

Figure 4:
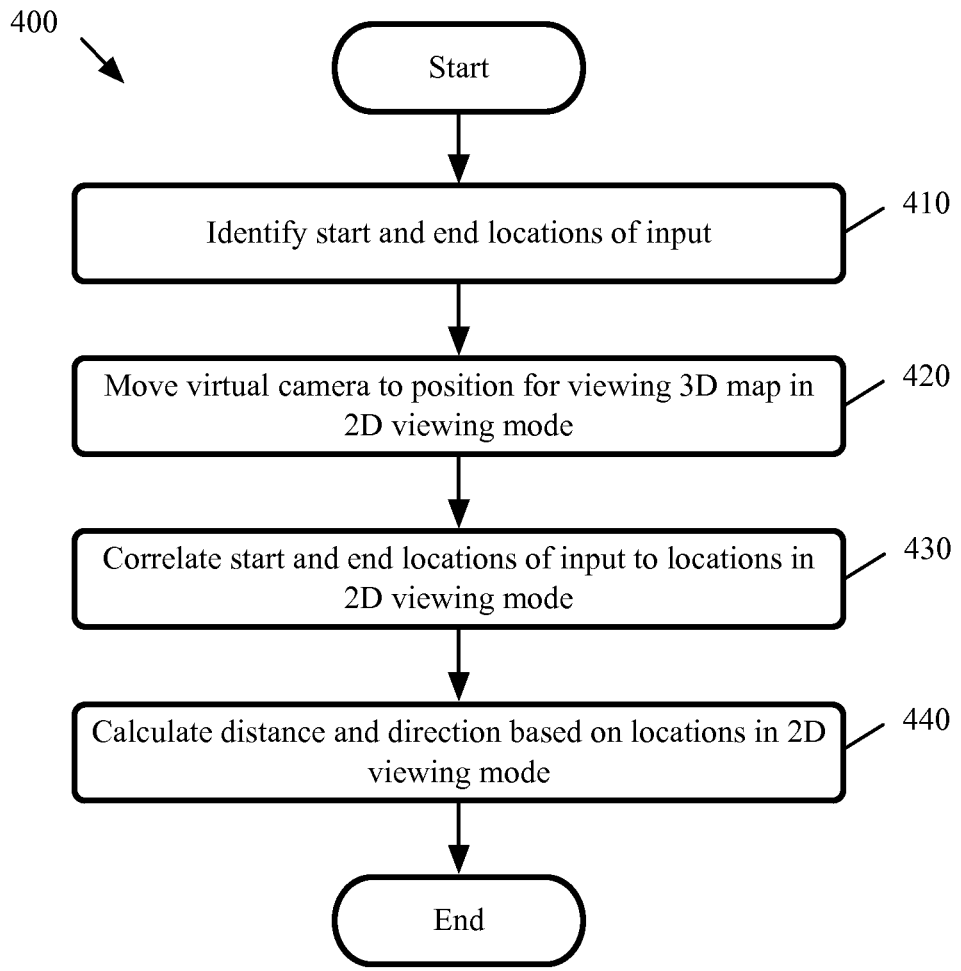
FIG. 4 conceptually illustrates a process of some embodiments for determining a panning movement.

As explained above, the mapping application of some embodiments determines a panning operation for panning a 3D map by applying input received through a 3D map view of a 3D map to a 2D orthographic view of the 3D map. FIG. 4 conceptually illustrates a process 400 of some embodiments for determining a panning movement. The mapping applications described above and below by reference to FIGS. 1, 2, and 8 perform the process 400 as part of performing a panning operation to a 3D map. In some embodiments, the process described above by reference to FIG. 3 performs the process 400 to implement a portion of the process (e.g., operation 320).

Figure 5:
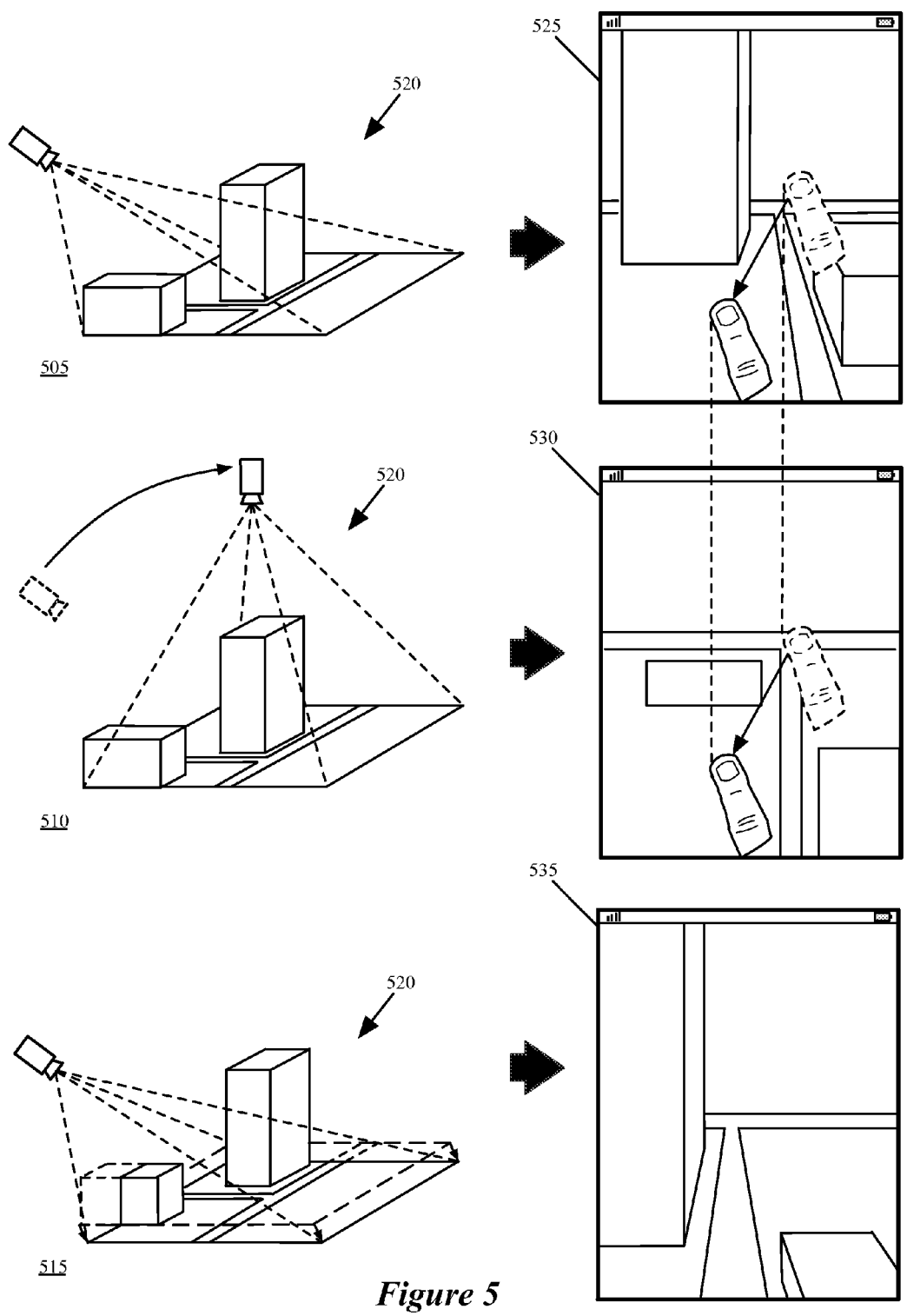
FIG. 5 conceptually illustrates an example of determining a panning movement based on a user's input to pan a 3D map.

The process 400 will be described by reference to FIG. 5, which conceptually illustrates an example of determining a panning movement based on a user's input to pan a 3D map. Specifically, FIG. 5 illustrates a virtual camera 500 at three different stages 505-515 that show a panning movement according to input provided from a user through a 3D map view of the 3D map. As shown, FIG. 5 illustrates a location in the 3D map 520 that includes two buildings and two roads that form a T-junction.

The process 400 begins by identifying (at 410) start and locations of input provided by a user to pan a 3D map. As discussed above and below by reference to FIGS. 1, 2, and 8, the mapping application of some embodiments defines swipe gestures as input for panning a 3D map. In some such embodiments, the process 400 identifies the start location of a swipe gesture as the location on the touchscreen at which the user initially touches the finger and the end location of the swipe gesture as the location on the touchscreen at which the user lifts the finger off the touchscreen.

Referring to FIG. 5 as an example, the first stage 505 illustrates the virtual camera 500 at a position pointing downwards towards the 3D map 520. In this example, the mapping application renders a 3D map view 525 of the 3D map 520 based on the field of view of the 3D map 520 identified by the virtual camera 500 in the first stage 505. Upon rendering the 3D map view 525, the mapping application displays the 3D map view 525 on a touchscreen of a device on which the mapping application is running.

The first stage 505 also illustrates that a user has provided input to pan the 3D map 520. In particular, the user touched a finger on the touchscreen displaying the 3D map view 525, dragged the finger downwards and towards the left, and lifted the finger off the touchscreen in order to pan the 3D map 520 towards the user and to the right. The user's input is indicated by an arrow from the point at which the user touched the touchscreen and to the point at which the user lifted the finger off the touchscreen. For the example illustrated in the first stage 505 of FIG. 5, the process 400 identifies the start location of the user's input as the location on the touchscreen at which the user initially touched the finger and the end location of the user's input as the location on the touchscreen at which the user lifted the finger off the touchscreen. In some embodiments, the mapping application iteratively performs incremental panning operations over the duration in which the user is providing input to pan rather than waiting for the user to complete the input before performing a panning operation.

Next, the process 400 moves (at 420) a virtual camera in the 3D map to a position for viewing the 3D map in a 2D viewing mode. In some embodiments, the virtual camera is in a 2D viewing mode when the virtual camera is pointing straight down at the 3D map (e.g., the virtual camera's line of sight is orthogonal to the ground of the 3D map). The process 400 of different embodiments moves the virtual camera to such an orientation differently. One technique for moving the virtual camera to a top-down viewing position is described in detail below by reference to FIGS. 6 and 7.

Continuing with the example in FIG. 5, the second stage 510 shows the virtual camera 500 at a position for viewing the 3D map 520 in a 2D viewing mode. As shown, the virtual camera 500 is positioned in a top-down viewing position for viewing the 3D map 520 in a 2D viewing mode. In this example, the process 400 of some embodiments moves the virtual camera 500 in the 3D map 520 to the top-down viewing position shown in the second stage 510.

In the example shown in the second stage 510, the process 400 of some embodiments does not actually move the virtual camera 500 because the mapping application is using it to render and display 3D map views of the 3D map. Rather, the process 400 in some such embodiments generates a copy (e.g., instantiates a new virtual camera that has the same data as the virtual camera 500) of the virtual camera 500 and uses the copy to determine the panning movement. As such, the second stage 510 is shown for purposes of explanation.

After moving the virtual camera, the process 400 then correlates (at 430) the identified start and end locations of the user's input to locations in a 2D orthographic view of the 3D map that the virtual camera identifies while in the 2D viewing mode. In some embodiments, the process 400 correlates the start and end locations of the user's input to locations in the 2D orthographic view by identifying first and second locations in the 2D map view of the 3D map that correspond to the start and end locations of the user's input.

In some embodiments, the process 400 identifies the first and second locations the 2D orthographic view of the 3D map by simulating (1) the display of the 2D orthographic view on the touchscreen of the device and (2) the application of the user's input on the touchscreen. The process 400 of some embodiments identifies the first location as the location in the simulated display of the 2D orthographic view that corresponds to the location on the touchscreen at which the user initially touches the finger and the second location as the location in the simulated display of the 2D orthographic view that corresponds to the location on the touchscreen at which the user lifts the finger.

Continuing with the second stage 510 in FIG. 5 as an example, the second stage 510 illustrates a 2D map view 530 of the 3D map 520 that the virtual camera 500 identifies from the top-down viewing position. As shown, the process 400 in this example correlates the start and end locations of the user's input in the first stage 505 to the locations illustrated in the 2D map view 530, as indicated by two dashed lines.

Finally, the process 400 calculates (at 440) a distance and direction based on the locations in the 2D viewing mode. In some embodiments, the process 400 calculates the distance and direction by determining a vector that starts from the first location and ends at the second location. The process 400 then ends.

Once the process 400 calculates the distance and direction, the mapping application of some embodiments pans the 3D map 520 in the calculated distance and for the calculated direction. Referring to FIG. 5 as an example, the third stage 515 illustrates the virtual camera 500 and the 3D map 520 after mapping application pans the 3D map 520. As shown, the virtual camera 500 has paned along a horizontal plane in a manner that causes the 3D map to pan towards and to the left relative to the user. Therefore, FIG. 5 illustrates the mapping application of some embodiments panning the 3D map 520 the same distance that the mapping application would pan the 3D map 520 if the user provided input directly to the 2D orthographic view 530 of the 3D map 520. In other words, based on the user's input through the 3D perspective view 525, the mapping application uses the distance calculated for panning the 2D orthographic view 530, which has a one-to-one correspondence with the user's input, to pan the 3D map 520 while viewing the 3D map 520 in a 3D perspective view. In addition, the third stage 515 shows a 3D map view 535 of the 3D map 520 that the mapping application renders based on the virtual camera 500's view of the 3D map 520.

Figure 6:
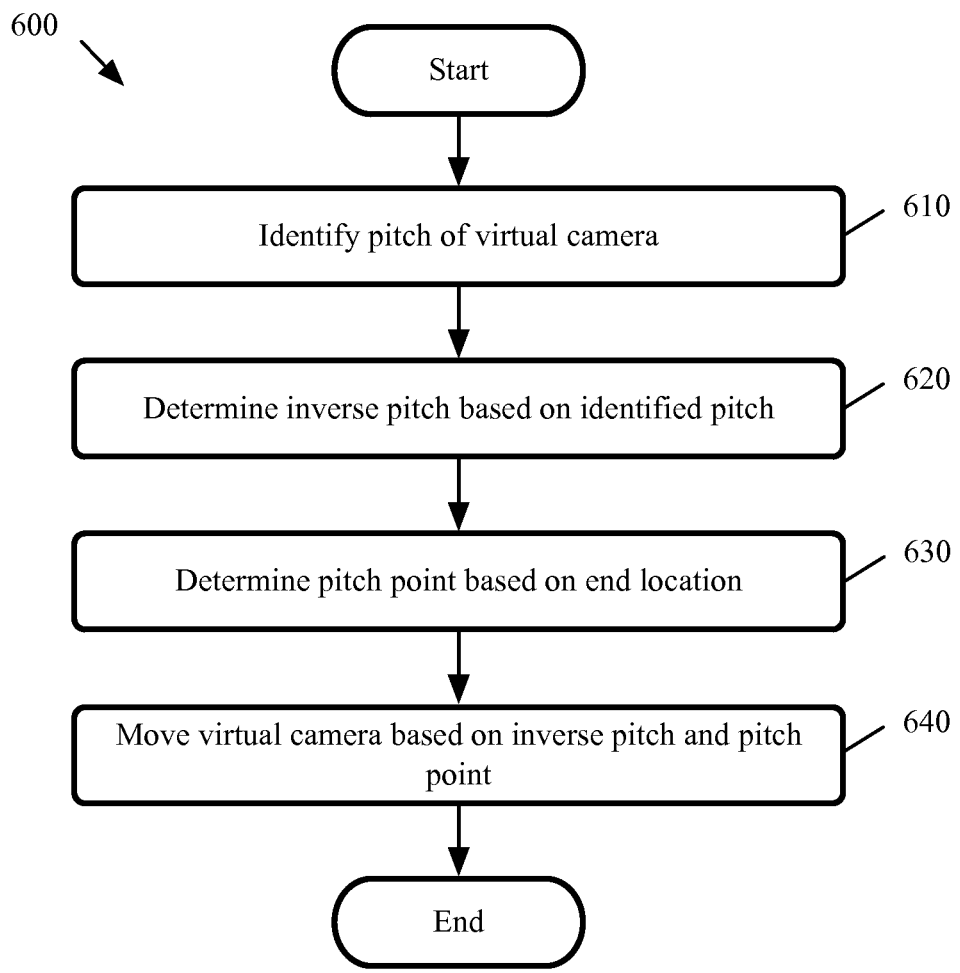
FIG. 6 conceptually illustrates a process of some embodiments for moving a virtual camera to a position for viewing a 3D map in a 2D viewing mode.

FIG. 6 conceptually illustrates a process 600 of some embodiments for moving a virtual camera to a position for viewing a 3D map in a 2D viewing mode. The mapping applications described above and below by reference to FIGS. 1, 2, and 8 perform, in some embodiments, the process 600 as part of performing a panning operation to a 3D map. In some embodiments, the processes described above by reference to FIGS. 3 and 4 perform the process 600 to implement a portion of the processes (e.g., operation 320 and 420).

Figure 7:
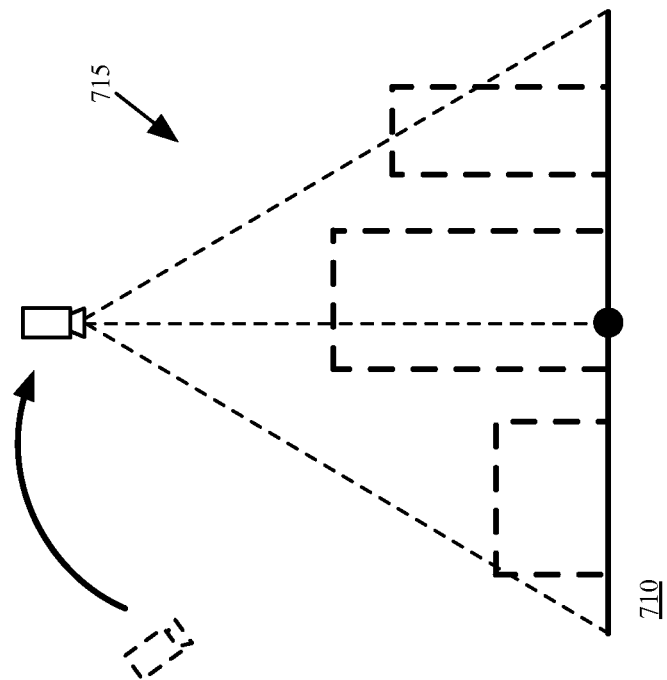
FIG. 7 conceptually illustrates an example of moving a virtual camera to a position for viewing a 3D map in a 2D viewing mode.
Figure 7:
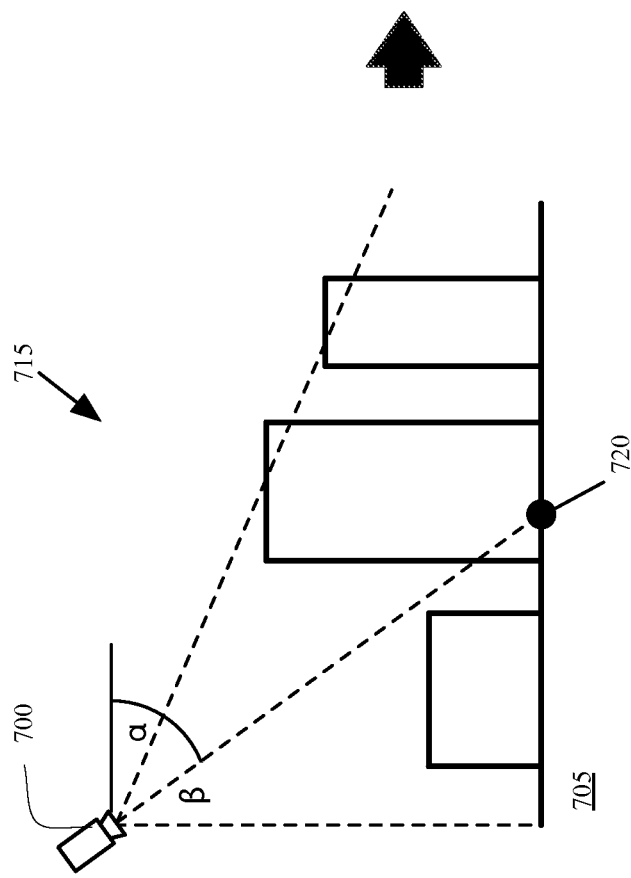

The process 600 will be described by reference to FIG. 7, which conceptually illustrates an example of moving a virtual camera 700 to a position for viewing a 3D map 715 in a 2D viewing mode. Specifically, FIG. 7 illustrates the virtual camera 700 at two different stages 705 and 710 that show the virtual camera 700 moving to a top-down viewing position for identifying a 2D map view that corresponds to a 3D map view of a 3D map 715.

The process 600 starts by identifying (at 610) the pitch of the virtual camera relative to a 3D map. In some embodiments, the process 600 identifies the pitch of the virtual camera as the angle formed by the virtual camera's line of sight relative to a horizontal axis at the position of the virtual camera. Referring to FIG. 7, the first stage 705 shows the virtual camera 700 at a particular position and orientation in the 3D map 715 for identifying a 3D map view. In some embodiments, the mapping application renders the identified 3D map view for display and receives input from a user through the displayed 3D map view. For this example, the first stage 705 illustrates the position and orientation of the virtual camera 700 in the 3D map 715 when the mapping application of some embodiments receives input from the user to pan the 3D map 715.

The first stage 705 illustrates a side view of the 3D map 715 along a plane that is parallel to the virtual camera's line of sight (e.g., the virtual camera's forward vector). For this example, the process 700 identifies the pitch of the virtual camera 700 in the 3D map 715 as an angle α formed by the virtual camera 700's line of sight relative to a horizontal axis at the position of the virtual camera 700 (e.g., −40 degrees). Other ways to identify and/or express the virtual camera 700's pitch are used in some embodiments.

Next, the process 600 determines (at 620) an inverse pitch based on the identified pitch of the virtual camera. In some embodiments, an inverse pitch is an amount to adjust the virtual camera's pitch so that the virtual camera is pointing straight down at the 3D map (e.g., the virtual camera's line of sight is orthogonal to the ground of the 3D map). Referring to FIG. 7, the first stage 705 also illustrates the inverse pitch of the virtual camera 700, indicated by an angle β, determined by the process 600 of some embodiments.

The process 600 then determines (at 630) a pitch point that is used to move the virtual camera to a position for viewing the 3D map in the 2D viewing mode. The pitch point, in some embodiments, is a point at the ground of the 3D map about which the process 6000 moves the virtual camera. Different embodiments determine the pitch point differently. For instance, in some embodiments, the process 600 determines the pitch point as the point on the ground of the 3D map at which the virtual camera's line of sight intersects the ground of the 3D map. The process 600 of some embodiments determines the pitch point based on the input provided by the user to pan the 3D map. For example, the process 600 in some such embodiments determines the pitch point by identifying the location at the ground of the 3D map that corresponds to the location of the start or end of the user's input (e.g., the start or end locations of a swipe gesture) in the 3D map view. Referring to the first stage 705 of FIG. 7, the process 600 for this example determines the pitch point as a point 720 at the ground of the 3D map 715 at which the virtual camera 700's line of sight intersects.

Finally, the process 600 moves (at 640) the virtual camera in the 3D map based on the determined inverse pitch and the pitch point in order to move the virtual camera to a position for viewing the 3D map in the 2D viewing mode. In some embodiments, the process 600 moves the virtual camera by (1) rotating the virtual camera about the pitch point in an upwards direction while maintaining a constant distance between the virtual camera and the pitch point and (2) adjusting the virtual camera's pitch according to the inverse pitch. The process 600 of some embodiments does not maintain the same distance when moving the virtual camera to the position for viewing the 3D map in the 2D viewing mode. After moving the virtual camera, the process 600 ends.

Referring to FIG. 7, the second stage 710 shows the virtual camera 700 after the process 600 of some embodiments positions the virtual camera 700 in a 2D viewing mode of the 3D map 715. As shown, the virtual camera 700 is positioned in a top-down viewing position. That is, the virtual camera 700 is oriented so that it is pointing directly down towards the 3D map 715 (e.g., the virtual camera 700's line of sight is orthogonal to the ground of the 3D map). In addition, the second stage 710 shows that the distance between the virtual camera 700 and the pitch point 720 shown in the first stage 705 is maintained.

II. Inertia for Panning

The figures described above illustrate several panning operations performed by the mapping application of some embodiments for panning a 3D map. In some embodiments, the mapping application provides an inertia effect for panning operations. When a user provides a particular type of input (e.g., input that terminates at a velocity greater than a threshold velocity) to pan the 3D map, the mapping application generates an inertia effect that causes the 3D map to continue panning and decelerate to a stop. The inertia effect in some embodiments provides the user with a more realistic interaction with the 3D map that mimics behaviors in the real world.

Figure 8:
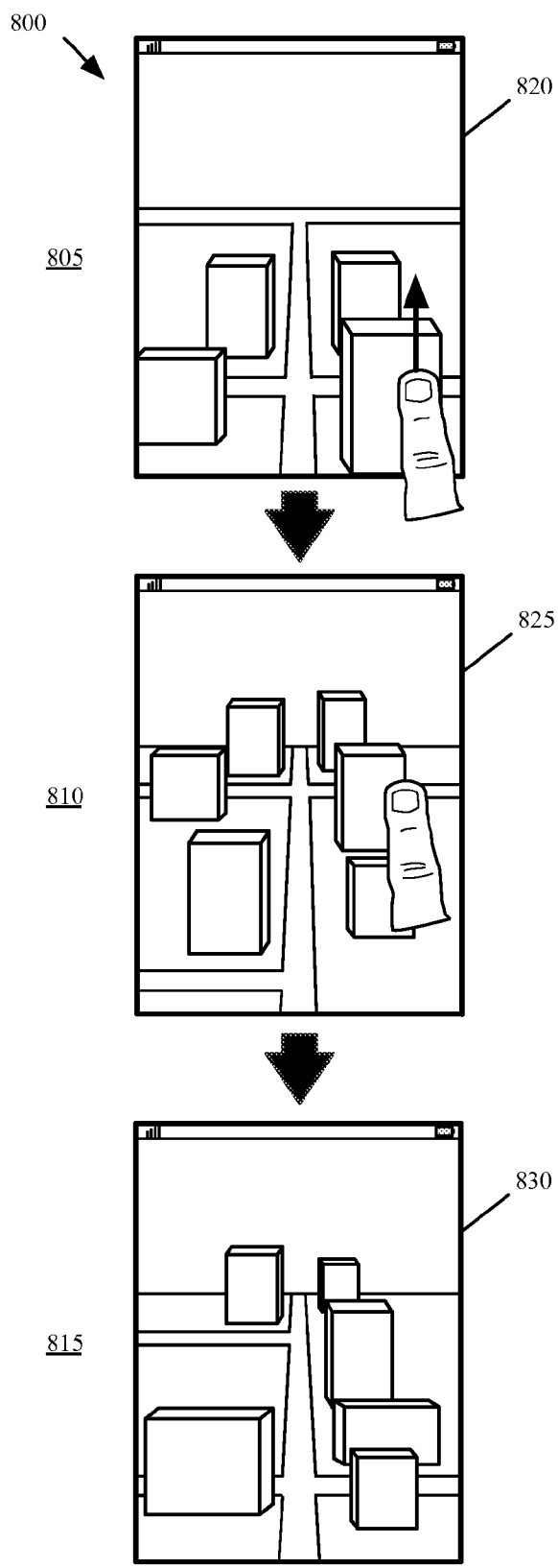
FIG. 8 conceptually illustrates an example inertia effect for a panning operation performed by a mapping application of some embodiments.

FIG. 8 conceptually illustrates an example inertia effect for a panning operation performed by a mapping application of some embodiments. Specifically, FIG. 8 conceptually illustrates a GUI 800 at three different stages 805-815 that shows an inertia effect for a panning operation according to some embodiments of the invention.

The first stage 805 illustrates a 3D map view 820 of a 3D map. As shown, the 3D map view 820 includes several roads and four buildings. As noted above, the mapping application of some embodiments displays a 3D map view by using a virtual camera that identifies a location and orientation of a field of view of a 3D map and rendering the field of view in order to generate the 3D map view for display on a device on which the mapping application is operating. The first stage 805 also shows a user providing input (e.g., a swipe gesture) to perform a panning operation on the 3D map by touching a finger on a touchscreen of the device and dragging the finger in an upward direction, as indicated by an arrow.

The second stage 810 shows the GUI 800 immediately after the user has completed the input to pan the 3D map. More specifically, the user in this example completed the input by lifting the finger off the touchscreen of the device. At the second stage 810, the GUI 800 is displaying a 3D map view 825 of the 3D map rendered by the mapping application. As shown, the mapping application has panned the 3D map in a direction away from the user from the 3D map view 820 to the 3D map view 825. The four buildings and roads shown in the 3D map view 820 appear farther back in the 3D map and two new buildings appear in the foreground.

Different embodiments use different techniques to implement an inertia effect for a panning operation. For instance, in some embodiments, the mapping application determines a velocity of the user's input at or near the instance at which the user lifts the finger from the touchscreen. The mapping application uses the velocity to determine an end point for the inertia effect and determines the manner at which the virtual camera used to view the 3D map decelerates (e.g., constant, exponential, logarithmic, etc.) to the end point. In some embodiments, the mapping application renders and displays an animation of the inertia effect (e.g., a decelerating pan of the 3D map from the 3D map view 825 to the end point).

The third stage 815 illustrates the GUI 800 after the mapping application has rendered and displayed the animation of the inertia effect. In particular, the GUI 800 is displaying a 3D map view 830 of the 3D map rendered by the mapping application. As illustrated in the third stage 815, the mapping application has panned the 3D map farther away from the user after the user completed the input in the second stage 810. The four buildings and roads shown in the 3D map view 825 have disappeared into the horizon, the two new buildings in the 3D map view 825 appear farther back in the 3D map, and four new buildings are shown in the foreground.

Figure 9:
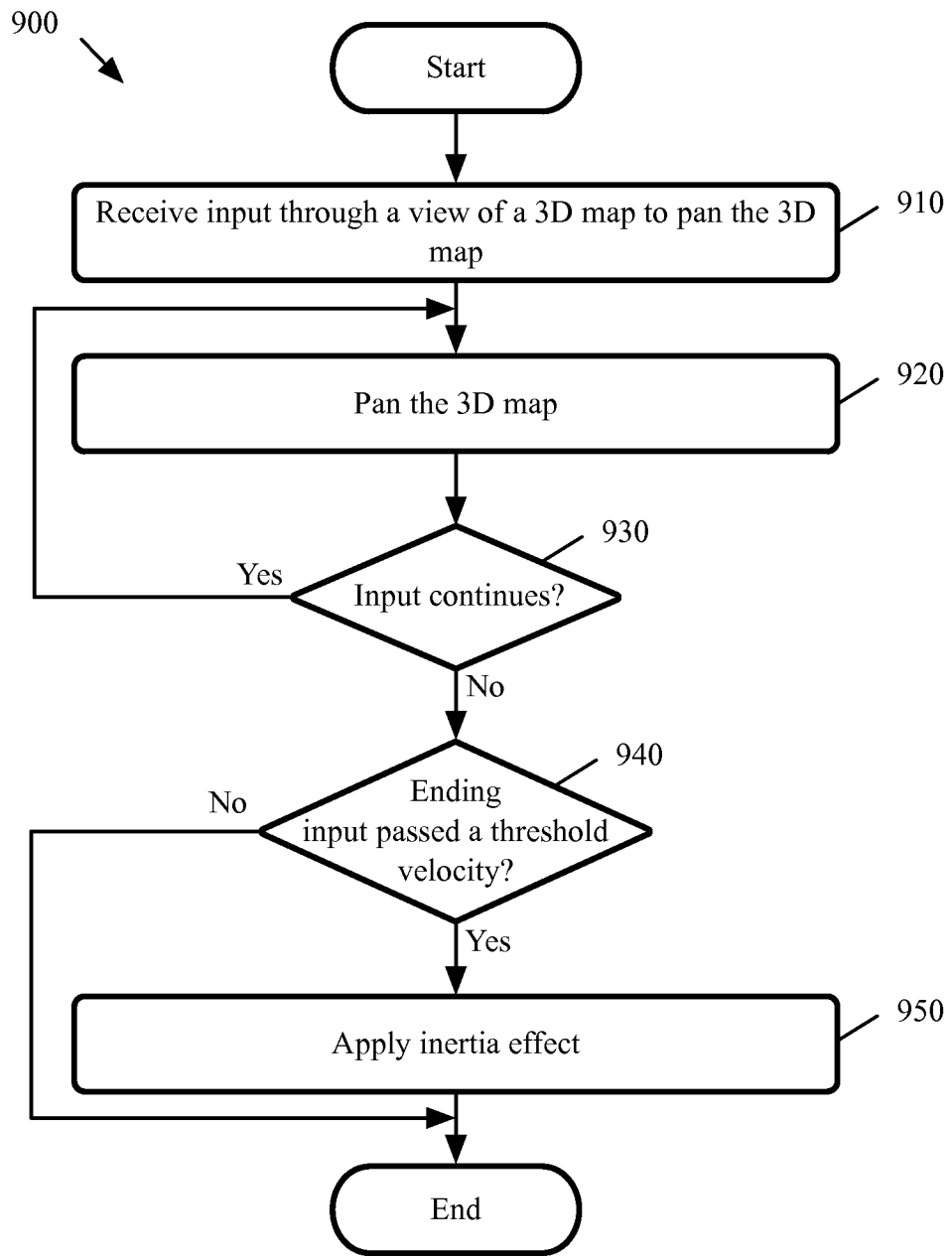
FIG. 9 conceptually illustrates a process of some embodiments for panning a 3D map with an inertia effect.

FIG. 9 conceptually illustrates a process 900 of some embodiments for panning a 3D map with an inertia effect. In some embodiments, The mapping applications described above by reference to FIGS. 1, 2, and 8 perform, in some embodiments, the process 600 as part of performing a panning operation to a 3D map.

The process 900 starts by receiving (at 910) input through a view of a 3D map to pan the 3D map. In some embodiments, the process 900 receives input from a user through a 3D map view displayed on a touch screen of a device on which the mapping application executing the process 900 is running Different embodiments define any number of different types of input for panning a 3D map. For instance, some embodiments define a single touch gesture, such as the ones described above by reference to FIGS. 1, 2, and 8 a multi-touch gesture (e.g., a two-touch swipe gesture), etc. for panning a 3D map.

Next, the process 900 pans (at 920) the 3D map based on the received input. Different embodiments pan the 3D map differently. For instance, in some embodiments, the process 900 pans the 3D map by performing the process described above by reference to FIG. 3.

The process 900 then determines (at 930) whether input is continuing to be received. In some embodiments, the mapping application of some embodiments iteratively performs incremental panning operations over the duration in which the user is providing input to pan. For example, the process 900 in some such embodiments iteratively performs a panning operation on the 3D map at defined intervals of time while the input is being provided. When the process 9000 determines that input is still being provided, the process 900 returns to 920 to continue panning the 3D map. When the process 9000 determines that input has ended, the process 900 proceeds to 940.

The process 400 in some such embodiments identifies the start and end locations based on an interval of time defined for each incremental panning operation. For instance, in some embodiments, the process 400 identifies the start location as the location on the touchscreen at which the user is touching the finger at the beginning of the time interval and the end location as the location on the touchscreen at which the user is touching the finger at the end of the time interval. In some other such embodiments, the process 400 identifies the start and end locations based on a threshold input amount. For instance, in some embodiments, the process 400 identifies the start location as the location on the touchscreen at which the user is first touches the finger and the end location as the location on the touchscreen at which the user is touching the finger upon traveling a threshold distance. The end location is used as the start location for the subsequent execution of the process 400.

At 940, the process 900 determines whether a velocity at or near the end of the input passes a defined threshold velocity. As explained above, the mapping application of some embodiments determines a velocity of the user's input at or near the instance at which the user lifts the finger from the touchscreen. In some embodiments, the process 900 determines the velocity in the same or similar manner. When the process 900 determines that the velocity passes the threshold velocity, the process 900 proceeds to 950. Otherwise, the process 900 ends.

Finally, the process 900 applies an inertia effect that continues the panning of the 3D map. As mentioned above, the mapping application uses the velocity to determine an end point for the inertia effect, determines the manner at which the virtual camera used to view the 3D map decelerates (e.g., constant, exponential, logarithmic, etc.) to the end point, and renders and displays an animation of the inertia effect. The process 900 of some embodiments applies the inertia effect in the same or similar fashion.

The FIGS. 8 and 9 described above illustrate an inertia effect for a panning operation while viewing the 3D map in a 3D perspective view. In some embodiments, the techniques described in these figures are used to apply an inertia effect for panning the 3D map while viewing the 3D map from a 2D orthographic view.

III. Software Architecture

Figure 10:
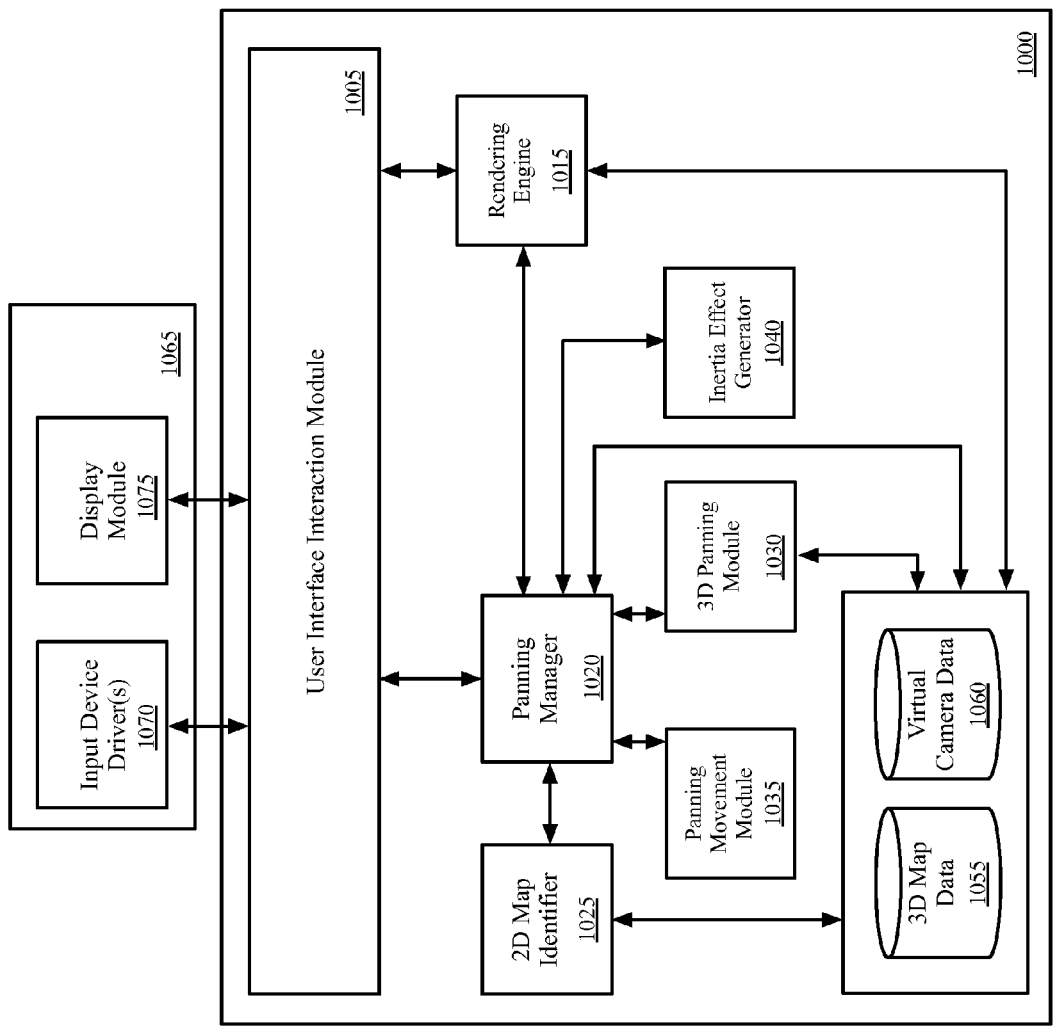
FIG. 10 conceptually illustrates a software architecture of an mapping application of some embodiments.

In some embodiments, the processes described above are implemented as software running on a particular machine, such as a computer, a handheld device (e.g., a smartphone), or a tablet computing device, or stored in a machine-readable medium. FIG. 10 conceptually illustrates a software architecture of a mapping application 1000 of some embodiments. In some embodiments, the mapping application is a stand-alone application or is integrated into another application (e.g., a navigation application), while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided as a thick client. That is, the application is distributed from the server to the client machine and runs on the client machine.

As shown, the mapping application 1000 includes a user interface (UI) interaction module 1005, a rendering engine 1015, a panning manager 1020, a 2D map identifier 1025, a 3D panning module 1030, a panning movement module 1035, and an inertia effect generator 1040. The mapping application 1000 also includes 3D map data storage 1055 and virtual camera data storage 1060. In some embodiments, the 3D map data storage 1055 stores data that defines 3D maps (e.g., street data, highway data, street intersection data, building data, land cover data, point of interest data, etc.) and other information for defining 3D maps.

The virtual camera data storage 1060 stores information about virtual cameras for identifying views of 3D maps. Examples of such information include coordinates of the virtual camera (e.g., x, y, and z coordinates) in a 3D map, a pan angle of the virtual camera, a tilt angle of the virtual camera, a roll angle of the virtual camera, a zoom level of the virtual camera, etc. In some embodiments, the storages 1055 and 1060 are stored in one physical storage while, in other embodiments, the storages 1055 and 1060 are stored on separate physical storages. Still, in some embodiments, some or all of the storages 1055 and 1060 are implemented across several physical storages.

FIG. 10 also illustrates an operating system 1065 that includes input device driver(s) 1070 and display module 1075. In some embodiments, the input device drivers 1070 and display module 1075 are part of the operating system 1065 even when the application is an application separate from the operating system 1065.

The input device drivers 1070 may include drivers for translating signals from a keyboard, mouse, touchpad, drawing tablet, touch screen, etc. A user interacts with one or more of these input devices, which send signals to their corresponding device driver. The device driver then translates the signals into user input data that is provided to the UI interaction module 1005.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the input device. An example of a device with such functionality is a touch screen device (e.g., as incorporated into a smart phone, a tablet computer, etc.). In some embodiments with touch control, a user directly manipulates objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 1075 translates the output of a user interface for a display device. That is, the display module 1075 receives signals (e.g., from the UI interaction module 1005) describing what should be displayed and translates these signals into pixel information that is sent to the display device. The display device may be an LCD, a plasma screen, a CRT monitor, a touch screen, etc.

The UI interaction module 1005 of the mapping application 1000 interprets the user input data received from the input device drivers 1070 and passes it to various modules, including the color balance tool manager 1020. The UI interaction module 1005 also manages the display of the UI and outputs this display information to the display module 1075. This UI display information may be based on information from the color balance tool manager 1020 or directly from input data (e.g., when a user moves an item in the UI that does not affect any of the other modules of the mapping application 1000).

The panning manager 1020 is responsible for handling panning operations on 3D maps. The panning manager 1020 may receive input from the UI interaction module 1005 to pan a 3D map. When panning a 3D map, the panning manager 1020 interacts with the 3D map identifier 1025, the panning movement module 1035, the 3D mapping module 1030, the inertia effect generator 1040, and the rendering engine 1015 in order to perform the panning operation. For example, when the panning manager 1020 receives input from the UI interaction module 1005 to pan a 3D map, the panning manager 1020 sends a request to the 2D map identifier 1025 to identify a corresponding 2D orthographic view of the 3D map. The panning manager 1020 sends the 2D orthographic view of the 3D map to the panning movement module 1035 to determine a distance and direction in to pan the 2D orthographic view of the 3D map. The panning manager 1020 then sends the determined distance and direction to the 3D panning manager 1030 in order to actually pan the 3D map according to the distance and direction. In some instances, the panning manager 1020 forwards the input from the UI interaction module 1005 to the inertia effect generator 1040 to generate an inertia effect for the panning operation. Finally, the panning manager 1020 instructs the rendering engine 1015 to render the panning of the 3D map.

The 2D map identifier 1025 identifies a corresponding 2D view of a 3D map based on a 3D view of the 3D map. When the 2D map identifier 1025 receives a request from the panning manager 1020 to identify the 2D view, the 2D map identifier 1025 in some embodiments accesses the 3D map data storage 1055 to identify the 3D map and accesses the virtual camera data storage 1060 identify the virtual camera that is being used to view the 3D map. The 2D map identifier 1025 then moves the virtual camera in the 3D map to a position for viewing the 3D map in a 2D viewing mode and identifies a 2D orthographic view of the 3D map that corresponds to the 3D view.

The panning movement module 1035 determines the manner in which to pan the 3D map. In some embodiments, when the panning movement module 1035 receives a 2D orthographic view of the 3D map and the input for the panning operation, the panning movement module 1035 determines a distance and direction in which to pan the 3D map based on the 2D orthographic view and the input.

The 3D panning module 1030 handles the panning of the 3D map. When the 3D panning module 1030 receives the distance and direction information from the panning manager 1020, the 3D mapping module 1030 accesses the 3D map data storage 1055 to identify the 3D map to pan and accesses the virtual camera data storage 1060 identify the virtual camera that is being used to view the 3D map. The 3D panning module 1030 then moves the virtual camera in the 3D map based on the distance and direction in order to pan the 3D map. In some cases, the 3D mapping module 1030 receives an inertia effect from the panning manager 1020 moves the virtual camera in the 3D map to implement the inertia effect.

The inertia effect generator 1040 is responsible for determining an inertia effect for the panning operation. When the inertia effect generator 1040 receives the input from the panning manager 1020, the inertia effect generator 1040 determines a pan of the 3D that produces the inertia effect for the panning operation.

The rendering engine 1015 handles the rendering of the panning of the 3D map for the display module 1075 to display on a device on which the mapping application 1000 operates. To render the panning of the 3D map, the rendering engine 1015 identifies the 3D map to pan from the 3D map data storage 1055 and identifies the virtual camera that is being used to view the 3D map from the virtual camera data storage 1060. The rendering engine 1015 then renders 3D views of the 3D map based on the 3D panning module 1030's panning of the 3D map.

While many of the features have been described as being performed by one module (e.g., the panning manager 1020, the inertia effect generator 1040, etc.), one of ordinary skill in the art would recognize that the functions might be split up into multiple modules. Similarly, the functions described as being performed by multiple different modules might be performed by a single module in some embodiments (e.g., the panning movement module 1035 might be part of the 3D panning module 1030).

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 11:
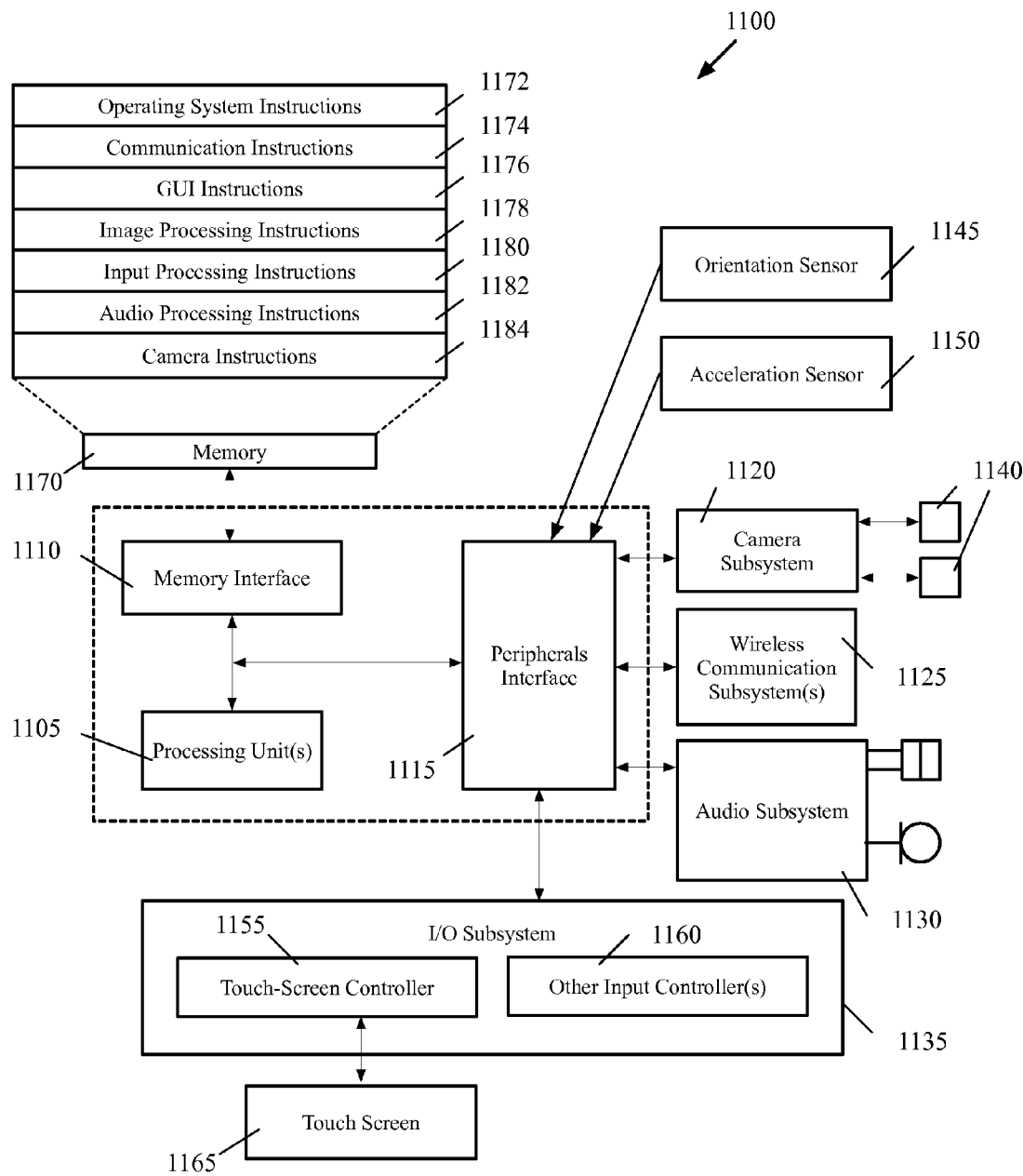
FIG. 11 conceptually illustrates an example of an architecture of a mobile computing device of some embodiments.

The mapping and navigation applications of some embodiments operate on mobile devices, such as smart phones (e.g., iPhones®) and tablets (e.g., iPads®). FIG. 11 is an example of an architecture 1100 of such a mobile computing device. Examples of mobile computing devices include smartphones, tablets, laptops, etc. As shown, the mobile computing device 1100 includes one or more processing units 1105, a memory interface 1110 and a peripherals interface 1115.

The peripherals interface 1115 is coupled to various sensors and subsystems, including a camera subsystem 1120, a wireless communication subsystem(s) 1125, an audio subsystem 1130, an I/O subsystem 1135, etc. The peripherals interface 1115 enables communication between the processing units 1105 and various peripherals. For example, an orientation sensor 1145 (e.g., a gyroscope) and an acceleration sensor 1150 (e.g., an accelerometer) are coupled to the peripherals interface 1115 to facilitate orientation and acceleration functions.

The camera subsystem 1120 is coupled to one or more optical sensors 1140 (e.g., a charged coupled device (CCD) optical sensor, a complementary metal-oxide-semiconductor (CMOS) optical sensor, etc.). The camera subsystem 1120 coupled with the optical sensors 1140 facilitates camera functions, such as image and/or video data capturing. The wireless communication subsystem 1125 serves to facilitate communication functions. In some embodiments, the wireless communication subsystem 1125 includes radio frequency receivers and transmitters, and optical receivers and transmitters (not shown in FIG. 11). These receivers and transmitters of some embodiments are implemented to operate over one or more communication networks such as a GSM network, a Wi-Fi network, a Bluetooth network, etc. The audio subsystem 1130 is coupled to a speaker to output audio (e.g., to output voice navigation instructions). Additionally, the audio subsystem 1130 is coupled to a microphone to facilitate voice-enabled functions, such as voice recognition (e.g., for searching), digital recording, etc.

The I/O subsystem 1135 involves the transfer between input/output peripheral devices, such as a display, a touch screen, etc., and the data bus of the processing units 1105 through the peripherals interface 1115. The I/O subsystem 1135 includes a touch-screen controller 1155 and other input controllers 1160 to facilitate the transfer between input/output peripheral devices and the data bus of the processing units 1105. As shown, the touch-screen controller 1155 is coupled to a touch screen 1165. The touch-screen controller 1155 detects contact and movement on the touch screen 1165 using any of multiple touch sensitivity technologies. The other input controllers 1160 are coupled to other input/control devices, such as one or more buttons. Some embodiments include a near-touch sensitive screen and a corresponding controller that can detect near-touch interactions instead of or in addition to touch interactions.

The memory interface 1110 is coupled to memory 1170. In some embodiments, the memory 1170 includes volatile memory (e.g., high-speed random access memory), non-volatile memory (e.g., flash memory), a combination of volatile and non-volatile memory, and/or any other type of memory. As illustrated in FIG. 11, the memory 1170 stores an operating system (OS) 1172. The OS 1172 includes instructions for handling basic system services and for performing hardware dependent tasks.

The memory 1170 also includes communication instructions 1174 to facilitate communicating with one or more additional devices; graphical user interface instructions 1176 to facilitate graphic user interface processing; image processing instructions 1178 to facilitate image-related processing and functions; input processing instructions 1180 to facilitate input-related (e.g., touch input) processes and functions; audio processing instructions 1182 to facilitate audio-related processes and functions; and camera instructions 1184 to facilitate camera-related processes and functions. The instructions described above are merely exemplary and the memory 1170 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 11 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 11 may be split into two or more integrated circuits.

B. Computer System

Figure 12:
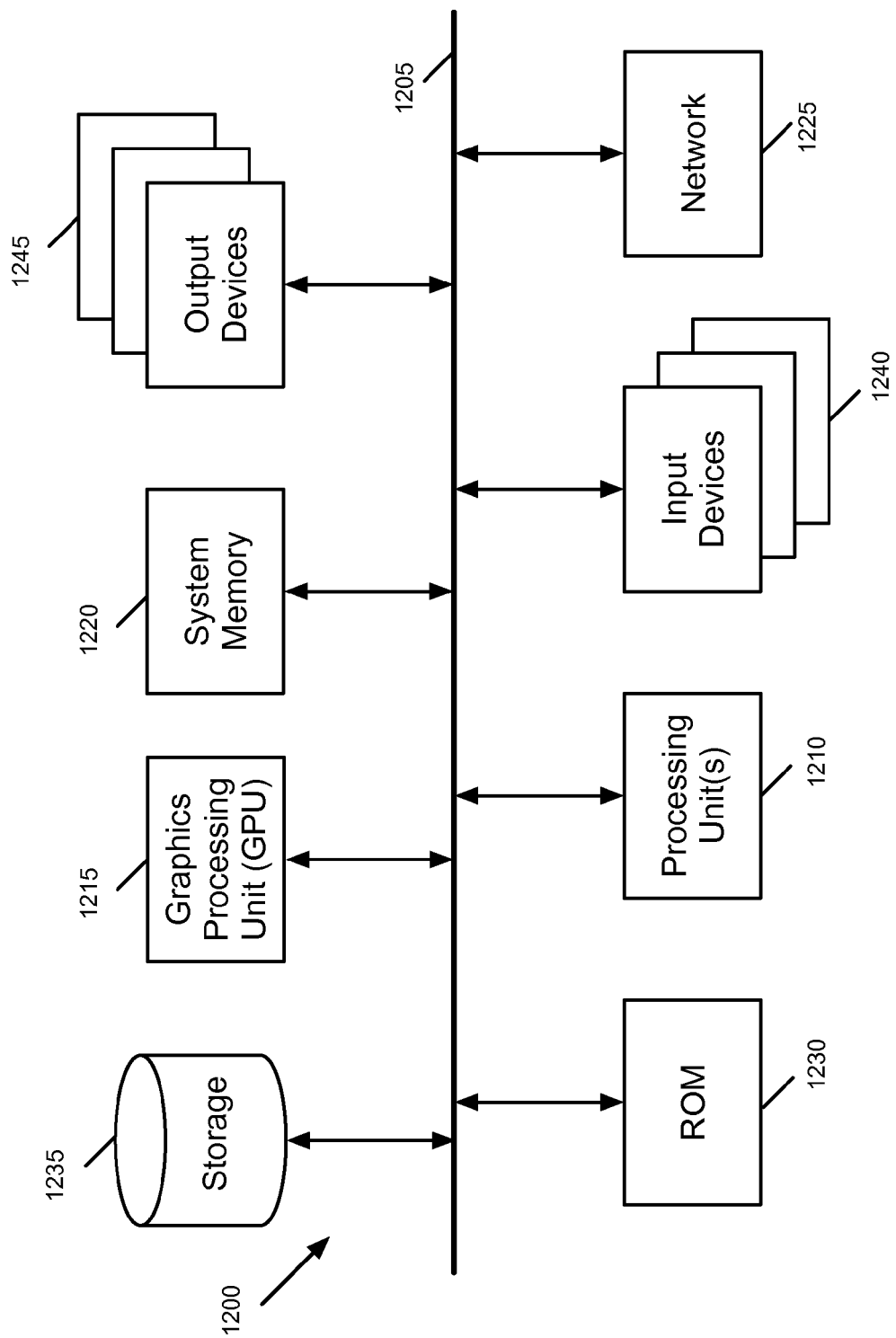
FIG. 12 conceptually illustrates an example of an electronic system with which some embodiments of the invention are implemented.

FIG. 12 conceptually illustrates another example of an electronic system 1200 with which some embodiments of the invention are implemented. The electronic system 1200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1200 includes a bus 1205, processing unit(s) 1210, a graphics processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the GPU 1215, the system memory 1220, and the permanent storage device 1235.

From these various memory units, the processing unit(s) 1210 retrieves instructions to execute and data to process in order to execute the processes of the invention. The processing unit(s) may be a single processor or a multi-core processor in different embodiments. Some instructions are passed to and executed by the GPU 1215. The GPU 1215 can offload various computations or complement the image processing provided by the processing unit(s) 1210. In some embodiments, such functionality can be provided using CoreImage's kernel shading language.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive, integrated flash memory) as the permanent storage device 1235.

Other embodiments use a removable storage device (such as a floppy disk, flash memory device, etc., and its corresponding drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor needs at runtime. In some embodiments, the invention's processes are stored in the system memory 1220, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

V. Map Service Environment

Figure 13:
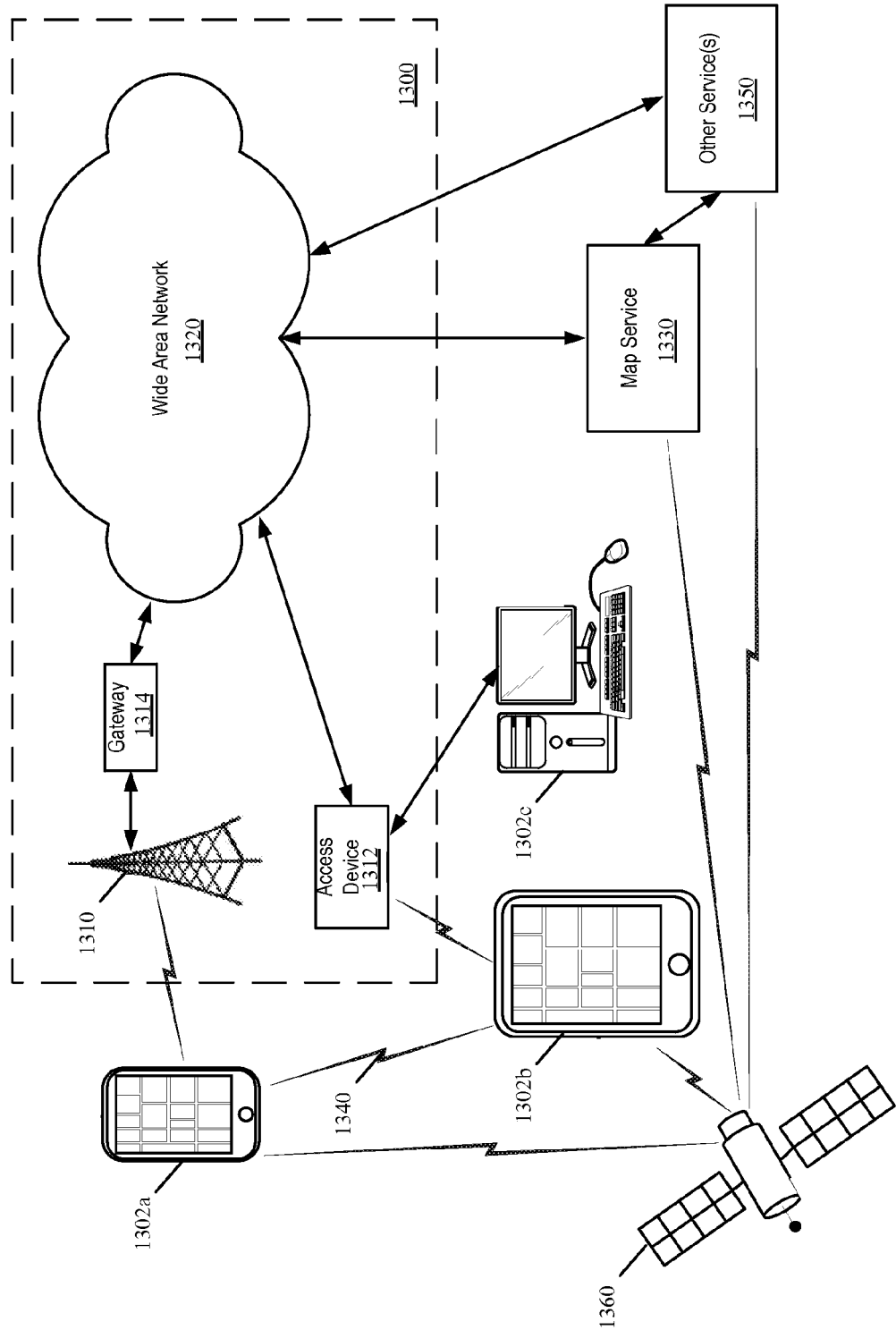
FIG. 13 conceptually illustrates an electronic device with which some embodiments of the invention are implemented.

Various embodiments may operate within a map service operating environment. FIG. 13 illustrates a map service operating environment, according to some embodiments. A map service 1330 (also referred to as mapping service) may provide map services for one or more client devices 1302a-1302c in communication with the map service 1330 through various communication methods and protocols. A map service 1330 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 1302a-1302c may utilize these map services by obtaining map service data. Client devices 1302a-1302c may implement various techniques to process map service data. Client devices 1302a-1302c may then provide map services to various entities, including, but not limited to, users, internal software or hardware modules, and/or other systems or devices external to the client devices 1302a-1302c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 1302a-1302c) are implemented on different portable-multifunction device types. Client devices 1302a-1302c utilize map service 1330 through various communication methods and protocols. In some embodiments, client devices 1302a-1302c obtain map service data from map service 1330. Client devices 1302a-1302c request or receive map service data. Client devices 1302a-1302c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices also order or prioritize map service data in certain techniques. For instance, a client device detects the motion or velocity of a virtual camera, which if exceeding certain threshold values, lower-detail image data is loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 13 illustrates one possible embodiment of an operating environment 1300 for a map service 1330 and client devices 1302a-1302c. In some embodiments, devices 1302a, 1302b, and 1302c communicate over one or more wire or wireless networks 1310. For example, wireless network 1310, such as a cellular network, can communicate with a wide area network (WAN) 1320, such as the Internet, by use of gateway 1314. A gateway 1314 in some embodiments provides a packet oriented mobile data service, such as General Packet Radio Service (GPRS), or other mobile data service allowing wireless networks to transmit data to other networks, such as wide area network 1320. Likewise, access device 1312 (e.g., IEEE 802.11g wireless access device) provides communication access to WAN 1320. Devices 1302a and 1302b can be any portable electronic or computing device capable of communicating with a map service. Device 1302*c* can be any non-portable electronic or computing device capable of communicating with a map service.

In some embodiments, both voice and data communications are established over wireless network 1310 and access device 1312. For instance, device 1302*a* can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1310, gateway 1314, and WAN 1320 (e.g., using Transmission Control Protocol/Internet Protocol (TCP/IP) or User Datagram Protocol (UDP)). Likewise, in some implementations, devices 1302*b* and 1302*c* can place and receive phone calls, send and receive e-mail messages, and retrieve electronic documents over access device 1312 and WAN 1320. In various embodiments, any of the illustrated client device may communicate with map service 1330 and/or other service(s) 1350 using a persistent connection established in accordance with one or more security protocols, such as the Secure Sockets Layer (SSL) protocol or the Transport Layer Security (TLS) protocol.

Devices 1302*a* and 1302*b* can also establish communications by other means. For example, wireless device 1302*a* can communicate with other wireless devices (e.g., other devices 1302*b*, cell phones, etc.) over the wireless network 1310. Likewise devices 1302*a* and 1302*b* can establish peer-to-peer communications 1340 (e.g., a personal area network) by use of one or more communication subsystems, such as Bluetooth® communication from Bluetooth Special Interest Group, Inc. of Kirkland, Wash. Device 1302*c* can also establish peer to peer communications with devices 1302*a* or 1302*b* (not shown). Other communication protocols and topologies can also be implemented. Devices 1302*a* and 1302*b* may also receive Global Positioning Satellite (GPS) signals from GPS satellites 1360.

Devices 1302*a*, 1302*b*, and 1302*c* can communicate with map service 1330 over the one or more wire and/or wireless networks, 1310 or 1312. For instance, map service 1330 can provide a map service data to rendering devices 1302*a*, 1302*b*, and 1302*c*. Map service 1330 may also communicate with other services 1350 to obtain data to implement map services. Map service 1330 and other services 1350 may also receive GPS signals from GPS satellites 1360.

In various embodiments, map service 1330 and/or other service(s) 1350 are configured to process search requests from any of client devices. Search requests may include but are not limited to queries for business, address, residential locations, points of interest, or some combination thereof. Map service 1330 and/or other service(s) 1350 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1330 and/or other service(s) 1350 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1330 and/or other service(s) 1350, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1330 and/or other service(s) 1350 provide one or more feedback mechanisms to receive feedback from client devices 1302*a*-1302*c*. For instance, client devices may provide feedback on search results to map service 1330 and/or other service(s) 1350 (e.g., feedback specifying ratings, reviews, temporary or permanent business closures, errors etc.); this feedback may be used to update information about points of interest in order to provide more accurate or more up-to-date search results in the future. In some embodiments, map service 1330 and/or other service(s) 1350 may provide testing information to the client device (e.g., an A/B test) to determine which search results are best. For instance, at random intervals, the client device may receive and present two search results to a user and allow the user to indicate the best result. The client device may report the test results to map service 1330 and/or other service(s) 1350 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 3, 4, 6, and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory machine-readable medium storing a program which when executed on a device by at least one processing unit performs panning operations on a three-dimensional (3D) map, the program comprising sets of instructions for:
 displaying, on a display screen, a first 3D perspective view of the 3D map, wherein a particular distance on a first section on the display screen correlates to a first distance in the 3D map and the same particular distance on a second section of the display screen correlates to a second, different distance, in the 3D map;
 receiving input to pan the first 3D perspective view of the 3D map, the input comprising movement of the particular distance on the display screen;
 in response to the input, determining a panning movement by correlating the input to a two-dimensional (2D) view of the 3D map to identify a translation distance in the 2D view of the 3D map such that the translation distance is the same irrespective of the portion of the display screen on which the movement of the particular distance occurs, wherein the 2D view of the 3D map is a different view of the 3D map than the 3D perspective view;
 panning the first 3D perspective view of the 3D map to a second 3D perspective view of the 3D map based on the translation distance; and
 rendering the second 3D perspective view of the 3D map for display on the device.

2. The non-transitory machine-readable medium of claim 1, wherein the display screen is a touchscreen, wherein the input to pan the first 3D perspective view of the 3D map is received through the touchscreen.

3. The non-transitory machine-readable medium of claim 2, wherein the input comprises a gestural input.

4. The non-transitory machine-readable medium of claim 2, wherein the gestural input comprises a swipe gesture.

5. The non-transitory machine-readable medium of claim 1, wherein the program further comprises a set of instructions for determining the 2D view of the 3D map that corresponds to the first 3D perspective view of the 3D map in response to the input to pan the first 3D perspective view of the 3D map.

6. The non-transitory machine readable medium of claim 5, wherein the set of instructions for determining the 2D view of the 3D map comprises sets of instructions for:
 identifying a perspective angle for the first 3D perspective view of the 3D map relative to a 2D orthographic view of the 3D map;
 determining a particular location in the 3D map for a center of the 2D view of the 3D map; and
 using the perspective angle and the particular location to determine the 2D view of the 3D map.

7. The non-transitory machine-readable medium of claim 1, wherein the 2D view of the 3D map is a 2D orthographic view of the 3D map.

8. The non-transitory machine-readable medium of claim 1, wherein the set of instructions for determining the panning movement comprises a set of instructions for determining the panning movement based on the input as applied to a simulated 2D view of the 3D map.

9. A non-transitory machine-readable medium storing an application which when executed by at least one processing unit provides a graphical user interface (GUI) for panning a three-dimensional (3D) map, the GUI comprising:
 a display area for (1) displaying, on a display screen, a 3D perspective view of the 3D map, wherein a particular distance on a first section on the display screen correlates to a first distance in the 3D map and the particular distance on a second section of the display screen correlates to a second, different distance, in the 3D map, and (2) receiving input to pan the 3D perspective view of the 3D map, the input comprising movement of the particular distance on the display screen; and
 a panning module for (1) correlating the input to a two-dimensional (2D) view of the 3D map to identify a translation distance in the 2D view of the 3D map such that the translation distance is the same irrespective of the portion of the display screen on which the movement of the particular distance occurs, wherein the 2D view of the 3D map is a different view of the 3D map than the 3D perspective view and (2) panning the 3D perspective view of the 3D map based on the identified translation distance.

10. The non-transitory machine-readable medium of claim 9, wherein the panning module is further for applying an inertia effect to the panning that causes the display area to display a decelerating pan of the 3D map.

11. The non-transitory machine-readable medium of claim 10, wherein the panning module applies the inertia effect by identifying a velocity at or near a termination of the received input.

12. The non-transitory machine-readable medium of claim 11, wherein when the velocity does not pass a defined threshold velocity, the panning module does not apply the inertia effect.

13. The non-transitory machine-readable medium of claim 12, wherein when the velocity passes the defined threshold velocity, the panning module applies the inertia effect to the panning.

14. The non-transitory machine-readable medium of claim 10, wherein the panning module applies the inertia effect by further determining, based on the identified velocity, a distance at which to apply the decelerating pan of the 3D map.

15. A method for controlling a virtual camera that identifies views of a three-dimensional (3D) map to render in order to perform panning operations on 3D map, the method comprising:
 rendering and displaying, on a display screen, a first 3D perspective view of 3D map based on a first position of the virtual camera in the 3D map, wherein a particular distance on a first section on the display screen correlates to a first distance in the 3D map and the same particular distance on a second section of the display screen correlates to a second, different distance, in the 3D map;
 receiving input to pan the 3D perspective view of the 3D map, the input comprising movement of the particular distance on the display screen;
 when the input is received, identifying a second position of the virtual camera in the 3D map for viewing the 3D map by:

using the input to identify a translation distance in a two dimensional (2D) orthographic view of the 3D map map such that the translation distance is the same irrespective of the portion of the display screen on which the movement of the particular distance occurs; and using the translation distance in the 2D orthographic view of the map to identify the second position of the virtual camera in the 3D map, wherein the 2D orthographic view of the 3D map is a different view of the 3D map than the 3D perspective view;

determining a panning movement based on the second position of the virtual camera in the 3D map; and rendering and displaying a plurality of 3D perspective views of the 3D map based on positions of the virtual camera while moving the virtual camera in the 3D map according to the panning movement.

16. The method of claim 15, wherein using the input to identify a translation distance in a 2D orthographic view of the 3D map comprises instantiating a copy of the virtual camera for viewing the 2D orthographic view of the 3D map.

17. The method of claim 15 further comprising continuing to render and display the first 3D perspective of the 3D map while identifying the second position.

18. The method of claim 15, wherein the input is a gestural input.

19. The method of claim 15, wherein the 2D orthographic view of the 3D map is not displayed.

20. The non-transitory machine-readable medium of claim 1, wherein the 2D view of the 3D map is not displayed, but is only used by the program to identify the translation distance for the 3D perspective view of the 3D map.

* * * * *